April 15, 1930. C. FORTIER 1,755,109
MACHINE FOR MAKING DENTAL ROLLS
Filed Nov. 9, 1928 3 Sheets-Sheet 1
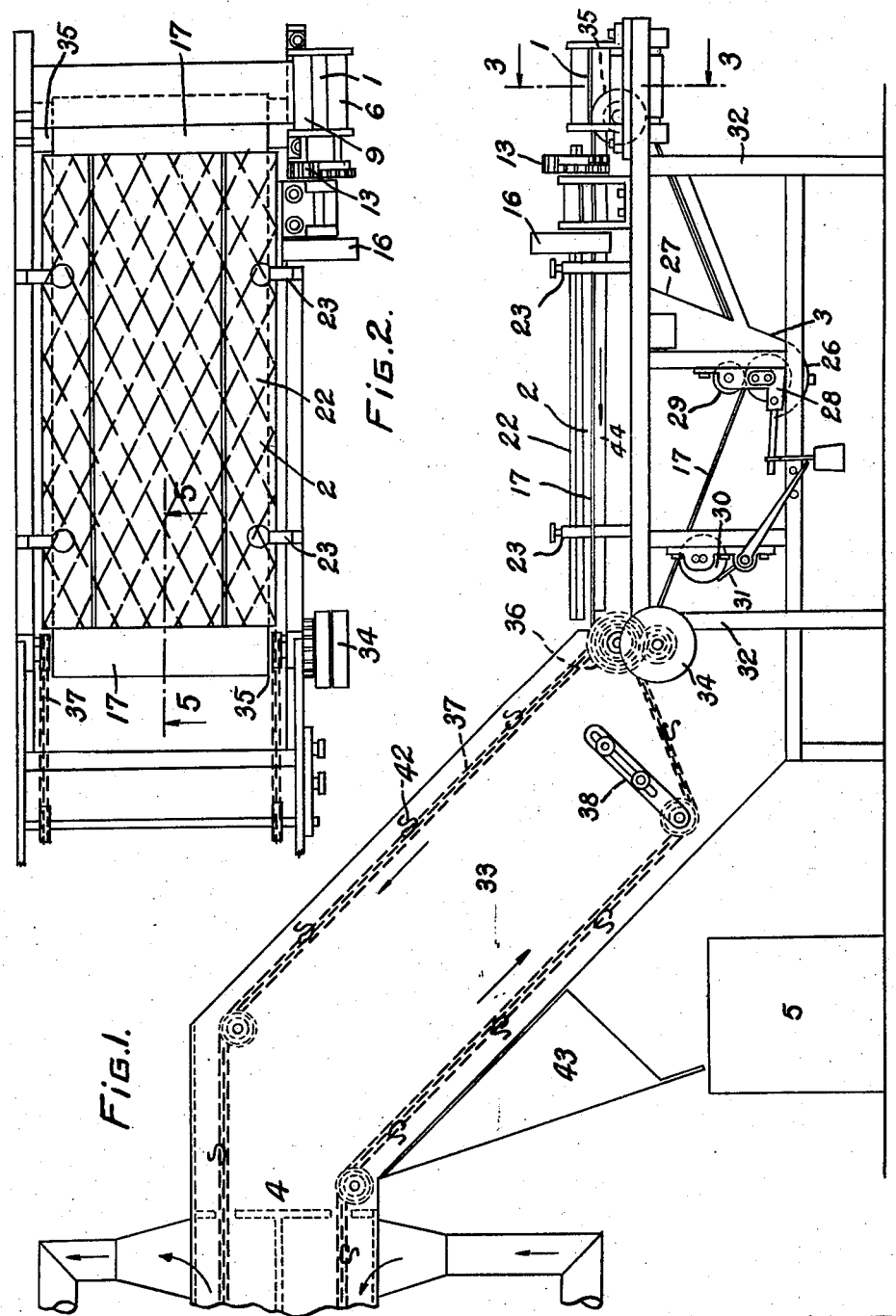
INVENTOR
Carolus Fortier
by
ATTORNEY.

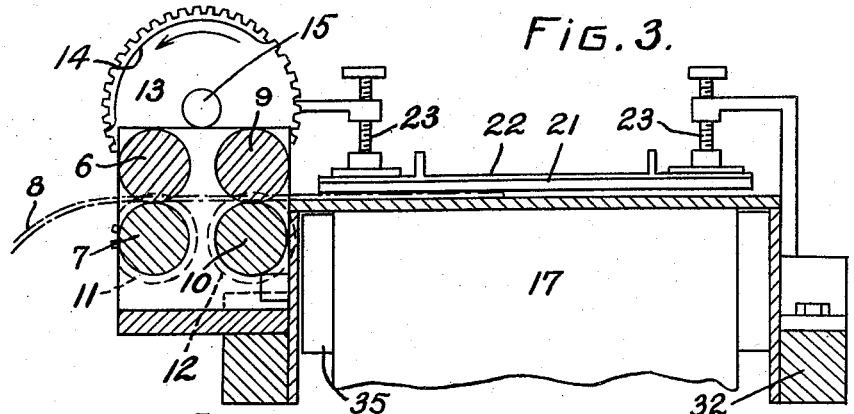
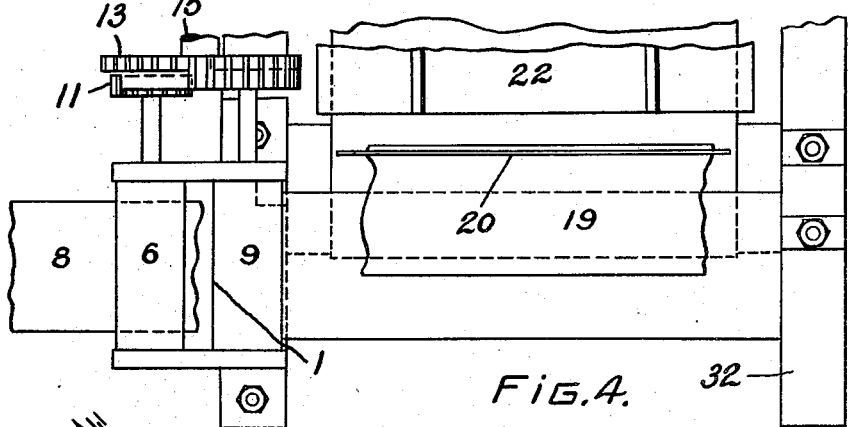
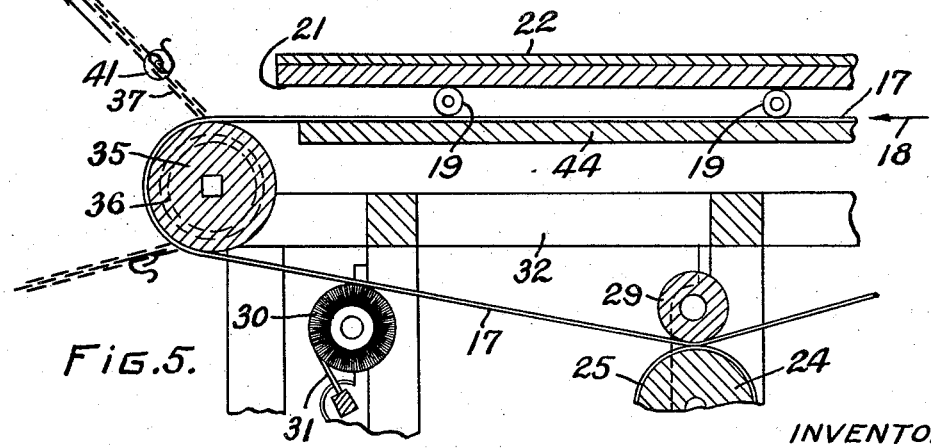

April 15, 1930.  C. FORTIER  1,755,109
MACHINE FOR MAKING DENTAL ROLLS
Filed Nov. 9, 1928   3 Sheets-Sheet 3

INVENTOR
Carolus Fortier
By
ATTORNEY.

Patented Apr. 15, 1930

1,755,109

UNITED STATES PATENT OFFICE

CAROLUS FORTIER, OF OUTREMONT, QUEBEC, CANADA

MACHINE FOR MAKING DENTAL ROLLS

Application filed November 9, 1928. Serial No. 318,302.

This invention relates to machines for making dental rolls, whereby a given length of a certain width of absorbent cotton is rolled over itself tightly and properly impregnated and dried, so as to form a round stick that may be cut into various lengths, for use in dental toilet, surgery and like purposes.

The principal object of this invention is to properly automatically roll and impregnate the predetermined layers of absorbent cotton, in the form required by the product. Another object is to automatically convey the impregnated and rolled product through a drying chamber and automatically deliver the same into a picking container.

These objects and other advantages will be shown in the herein specification and in the accompanying drawings, in which:—

Figure 1 is a general view, in side elevation of the invention.

Figure 2 is a top view, partly broken away on Figure 1.

Figure 3 is an enlarged vertical cross view of the automatic feeding and separating mechanism, taken on line 3—3 of Figure 1.

Figure 4 is a top view of Figure 3, shown in the action of having separated the predetermined length of the layer, which has now been placed into position for the automatic rolling action.

Figure 5 is a longitudinal view, taken on the line 5—5 of Figure 2, showing the rolling and impregnating mechanism, also relative position of the drying conveyor.

Similar reference characters represent similar parts of all views.

Figure 6:
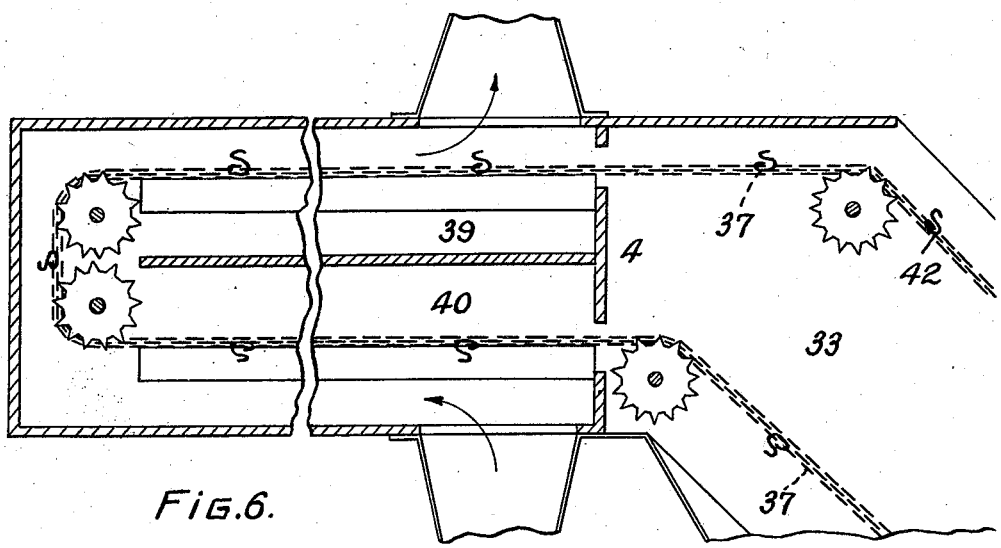
Figure 6 is a fragmentary view of the automatic conveyor through the drying chamber.

The manufactured material used in this product is generally put up in large size rolled bales and is mostly of uniform widths. The unrolled end of the material is placed into the automatic feeding and separating mechanism unit 1. The separated length of the layer of material may then be manually pushed upon the rolling mechanism unit 2, which is being supplied automatically with an impregnating liquid deposited by the impregnating unit 3. After the product is rolled, it is automatically hooked and conveyed through a drying chamber 4, to be afterwards delivered automatically into a receptacle 5, from which the finished product is taken and suitably packed.

The feeding and separating mechanism unit 1, consists of a pair of rollers 6 and 7, between which the material 8 is first inserted, said rollers 6 and 7 having an intermittent feeding action while rolling and predeterminedly ceasing its rolling action to hold the end of the material 8 tight, while another pair of rollers 9 and 10, journaled at a suitable distance from said rollers 6 and 7 constantly rotate to feed, thus tearing or separating in predetermined lengths the said layer of material 8. The relative motion of each pair of rollers 6 and 7 and 9 and 10, is transmitted through a pinion 11 integral with the roller 7 and a pinion 12 integral with the roller 10, by a gear 13 having an intermittance or smooth portion 14 that causes the temporary stop of the rollers 6 and 7. The gear 13 is suitably mounted upon a shaft 15 actuated by a belt pulley 16.

The rolling mechanism unit 2, consists of an endless belt 17 travelling in the direction indicated by the arrow 18, upon which the layer 19 has been partly pushed (see Figure 4), after having placed a rigid wire or rod 20, projecting across and beyond the layer 19 and across the width of the belt 17, on the forward edge of the said layer 19. The belt 17 conveys the layer 19 under the edge of a stationary platform 21, to which the edge of the layer 19, bearing the rod 20, adheres sufficiently to cause its unrolling around the said rod 20, as it advances in contact with the belt 17. The platform 21 is preferably made of wood and is fastened or secured under a suitable rigid plate 22 and can be easily made adjustable by means of suitable jack screws 23. Therefore, the platform 21 can conveniently be adjusted to continuously be in suitable contact for rolling of the layers 19.

The impregnating unit 3, consists of a roller 24, covered preferably with a substantial layer of linen 25, or other suitable absorbent material, revolvingly bathing in a bath of a liquid suitable preferably a mixture of flour and water conveniently placed into a receptacle 26 having a suitable funnel-shaped filler 27. The belt 17 is maintained closely in contact with the layer 25 of the roller 24, by means of a suitable idler 29 acting as a tightener for the same. The liquid deposited upon the belt 17, will carry some pickings off the absorbent cotton layer 19, and said pickings are preferably taken off the said belt 17 by means of a suitable idling roller carrying brush 30, against which the belt 17 comes in contact, and a suitable comb 31 coming in forced contact with the said brush 30, whereby the cotton pickings may readily be plucked by the comb 31, which can easily be cleaned.

The framework 32 supporting the units 1, 2 and 3 may also support the framework 33 in which is mounted a conveyor for carrying the rolled layers 19 to the drying chamber 4. Units 2 and 3 are actuated preferably by a double pulley 34 suitably geared to rear roller 35, pulling the belt 17 horizontally, on either end of which are mounted sprockets 36, from which a suitable endless chain 37 is driven. A conveyant tightener 38 is mounted across the framework 33, for maintaining a taut drive of the endless chain 37.

The drying chamber 4 consists of a suitable long oven having upper and lower compartments 39 and 40 respectively. Openings are made into the walls of this chamber 4, for the free passage of the chain 37 carrying the rolled layers 19, which now may be called rolls 41. A supply of hot air is furnished through the lower compartment 40 that circulates through the entire length thereof and similarly through the compartment 39.

Figure 7:
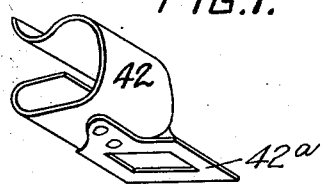
Figure 7 is a perspective view of the preferred form of hook used for carrying the rolls on the conveyor.
Figure 8:
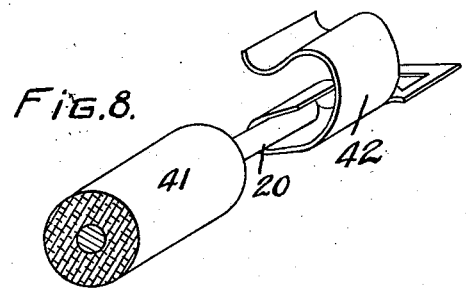
Figure 8 is a perspective view showing the manner in which the hook carries the roll on the conveyor.
Figure 9:
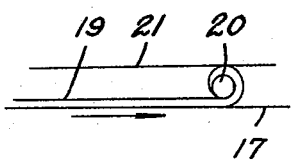
Figures 9, 10 and 11 are diagrammatical views showings the manner in which the product is rolled.
Figure 10:
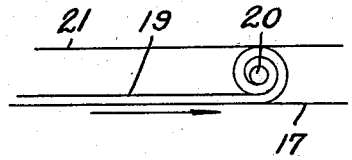
Figure 11:
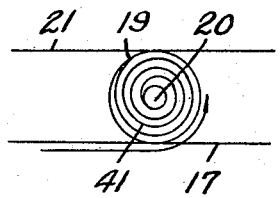

Mounted at predetermined intervals upon the chain 37, are hooks 42 (see Figure 7). The hooks 42 which are of S shape are mounted on a base 42ª, each of said hooks being suitably secured at intervals on the chain 37, and are so constructed that they carry the rods 20, while ascending obliquely, hold the same while going horizontally in the same direction, similarly when descending vertically and moving back horizontally, until they descend obliquely, when the rods 20 fall out of them, when they have reached a point above the chute 43, which directs the said rods 20 carrying the rolls 41 into the receptacle 5.

The platform 21 is preferably grooved under, as shown in dotted lines in Figure 2, for several purposes. First:—to prevent the platform from warping or splitting by contraction or expansion. Second:—to amass and distribute evenly the impregnating deposit adhering from the enrolling layers 19. Third:—to give a better friction bearing to the unrolling layers 19. The supporting body 44, maintaining a steady horizontal bearing for the belt 17 may suitably be grooved longitudinally, for facilitating the movement of the belt 17, as well as preventing the said part 4 from warping and splitting.

While I have here shown but one preferred form of construction of my invention, it will be obvious that many changes can be made therein, without departing from the spirit and scope thereof.

What I claim as my invention is:—

1. A machine of the character described, comprising means for feeding and separating a continuous layer of material into suitable layers of equal lengths, a stationary platform, a belt travelling below said stationary platform, carrying said layers of material whereby when said layers engage between said belt and said stationary platform, the said layers will be rolled, means for depositing a suitable substance on said belt whereby said layers will be impregnated therewith, substantially as described.

2. A machine of the character described, comprising means for feeding and separating a continuous layer of material into suitable layers of equal lengths, a stationary platform, a belt travelling below said stationary platform, carrying said layers of material whereby when said layers engage between said belt and said stationary platform, the said layers will be rolled, means for depositing a suitable substance on said belt whereby said layers will be impregnated therewith, and means to brush said belt, substantially as described.

3. In a machine of the character described, in combination with a drying chamber comprising a stationary platform, a belt travelling below said stationary platform carrying said layers of material whereby when said layers engage between said belt and platform the said layers will be rolled, and means to convey said rolled layers to said drying chamber, substantially as described.

4. The method of making the article of manufacture of the character described, consisting in cutting in lengths from a continuous roll of suitable material a plurality of layers placing a rod adjacent one of the edges of each of said layers, rolling said layer around said rod and simultaneously impregnating said layer with a suitable substance and drying said rolled layer in a drying chamber, substantially as described.

Signed at Montreal, Quebec, Canada, this 15th day of October, 1928.

CAROLUS FORTIER.